United States Patent
Lissianski et al.

(10) Patent No.: US 9,624,441 B2
(45) Date of Patent: Apr. 18, 2017

(54) CARBON TO LIQUIDS SYSTEM AND METHOD OF OPERATION

(71) Applicant: General Electric Company, Schenectady, NY (US)

(72) Inventors: Vitali Victor Lissianski, Schenectady, NY (US); Surinder Prabhjot Singh, Schenectady, NY (US); Dhaval Aijt Bhandari, Troy, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/167,440

(22) Filed: May 27, 2016

(65) Prior Publication Data

US 2016/0272896 A1    Sep. 22, 2016

Related U.S. Application Data

(62) Division of application No. 13/689,235, filed on Nov. 29, 2012, now Pat. No. 9,359,558.

(51) Int. Cl.
*C10G 2/00* (2006.01)
*C01B 3/38* (2006.01)
(Continued)

(52) U.S. Cl.
CPC .................. *C10G 2/34* (2013.01); *C01B 3/34* (2013.01); *C01B 3/386* (2013.01); *C10G 2/32* (2013.01);
(Continued)

(58) Field of Classification Search
CPC ............... C10G 2/34; C10G 2/32; C10K 3/04
See application file for complete search history.

(56) References Cited

U.S. PATENT DOCUMENTS

| 6,114,400 A | 9/2000 | Nataraj et al. |
| 6,403,660 B1 | 6/2002 | Espinoza et al. |

(Continued)

FOREIGN PATENT DOCUMENTS

| AU | 2007233514 B2 | 11/2011 |
| CN | 1305444 A | 7/2001 |

(Continued)

OTHER PUBLICATIONS

Rohde et al., "Fischer-Tropsch Synthesis with In Situ H2O Removal—Directions of Membrane Development", Microporous and Mesoporous Materials, vol. 115, Issue 1-2, pp. 123-136, Oct. 1, 2008.

(Continued)

*Primary Examiner* — Jafar Parsa
(74) *Attorney, Agent, or Firm* — Francis T. Coppa

(57) ABSTRACT

A carbon to liquids system comprising: a source of syngas; a first reactor coupled in flow communication with said syngas source and configured to receive a flow of syngas therein, said first reactor comprising a polymeric material, wherein said first reactor reacts the syngas and a catalyst in a Fischer-Tropsch reaction that produces a product comprising steam, wherein the polymeric material is configured to permit the permeation of the steam therethrough; and a recycle path coupled in flow communication with said first reactor, wherein said recycle path is configured to channel the permeated steam to a vessel positioned upstream from said first reactor. A method of operating a carbon to liquids system includes receiving a flow of syngas and reacting the syngas and a catalyst to produce a product including steam. The method also includes recycling the permeated steam to a vessel positioned upstream from the reactor.

14 Claims, 2 Drawing Sheets

(51) Int. Cl.
*C01B 3/34* (2006.01)
*C10K 3/04* (2006.01)

(52) U.S. Cl.
CPC ........ *C10K 3/04* (2013.01); *C01B 2203/0205* (2013.01); *C01B 2203/0261* (2013.01); *C01B 2203/062* (2013.01)

(56) References Cited

U.S. PATENT DOCUMENTS

| | | | |
|---|---|---|---|
| 7,109,248 | B2 | 9/2006 | Bowe |
| 7,300,642 | B1 | 11/2007 | Pedersen et al. |
| 7,829,602 | B2 | 11/2010 | Litt et al. |
| 7,871,577 | B2 | 1/2011 | Allam et al. |
| 7,879,919 | B2 | 2/2011 | Ernst et al. |
| 7,989,511 | B2 | 8/2011 | Casey et al. |
| 2003/0171442 | A1 | 9/2003 | Rytter |
| 2005/0184009 | A1* | 8/2005 | Jansen ............... B01D 67/0051 210/638 |
| 2005/0261382 | A1* | 11/2005 | Keyser ..................... C01B 3/36 518/702 |
| 2008/0098654 | A1 | 5/2008 | Cherry et al. |
| 2008/0210596 | A1* | 9/2008 | Litt ..................... B01J 19/0093 208/20 |
| 2009/0170964 | A1* | 7/2009 | Fayyaz Najafi ......... B01J 8/009 518/700 |
| 2009/0235671 | A1* | 9/2009 | Rabovitser ................ F02C 6/18 60/806 |
| 2014/0102981 | A1 | 4/2014 | Miglio et al. |

FOREIGN PATENT DOCUMENTS

| | | |
|---|---|---|
| CN | 101410332 A | 4/2009 |
| CN | 102458620 A | 5/2012 |

OTHER PUBLICATIONS

Martin Philipp Rohde, "In-situ H2O removal via hydrophilic membranes during Fischer-Tropsch and other fuel-related synthesis reactions", Dissertation, Jul. 16, 2010, KIT Scientific Publishing.
Unofficial English Translation of Chinese Office Action issued in connection with corresponding CN Application No. 201310628569.8 on Jun. 2, 2016.

* cited by examiner

CARBON TO LIQUIDS SYSTEM AND METHOD OF OPERATION

This application is a Divisional of Ser. No. 13/689,235 filed Nov. 29, 2012, now allowed.

BACKGROUND OF THE INVENTION

The field of the present disclosure relates generally to carbon to liquids systems and, more specifically to a Fischer-Tropsch reactor having increased carbon to liquids conversion.

The terms C5+ and "liquid hydrocarbons" are used synonymously to refer to hydrocarbons or oxygenated compounds having five (5) or greater number of carbons, including for example pentane, hexane, heptane, pentanol, and pentene, which are liquid at normal atmospheric conditions. The terms C4− and "gaseous hydrocarbons" are used synonymously to refer to hydrocarbons or oxygenated compounds having four (4) or fewer number of carbons, including for example methane, ethane, propane, butane, butanol, butene, and propene, which are gaseous at normal atmospheric conditions.

At least some known Fischer-Tropsch (FT) units in combination with steam methane reforming (SMR) units have been optimized to produce synthetic fuel (synfuel) from natural gas, also known as a Gas-to-Liquids process (GTL). Typically, natural gas refers to methane-rich gas mixture that can include carbon dioxide, nitrogen, hydrogen sulfide, and other hydrocarbons in various proportions. In at least some known GTL processes, natural gas is converted to synthesis gas (syngas) with a steam reformer for use in the FT reactor. Known steam reformers generally operate at temperatures of about 800.degree. C., which requires pre-heating of the natural gas and steam used therein. Steam reforming is an endothermic process, and thus requires an external heat source to maintain a suitable process temperature. As such, in these known reformers a portion of the natural gas is combusted to produce the heat required for the pre-heating and reforming processes. However, using a portion of natural gas for these purposes reduces the overall cost efficiency of the GTL system.

The reaction chemistry of a FT process involves converting hydrogen and carbon monoxide to a variety of hydrocarbons and water with a catalyst. While these known catalysts activate the FT reaction, water produced during FT synthesis may decrease the conversion of carbon monoxide by deactivating the catalyst. For example, high water partial pressure may cause deactivation of the catalyst by oxidizing the active catalyst sites, while low water partial pressure may cause competitive adsorption among water, carbon monoxide, and hydrogen molecules on the catalyst active site. At least some known methods for facilitating preventing deactivation of a FT catalyst include controlling the partial pressure of water produced during FT synthesis and/or increasing the catalyst's resistance to attrition by adding a certain quantity of titanium. However, these known methods may be costly to implement and may facilitate only marginal improvements in overall carbon monoxide conversion.

BRIEF DESCRIPTION OF THE INVENTION

In one aspect, a method of operating a carbon to liquids system is provided. The method includes receiving a flow of syngas and reacting, in a reactor, the syngas and a catalyst in a Fischer-Tropsch reaction to produce a product including steam, wherein the reactor includes a polymeric material that is configured to permit the permeation of the steam therethrough. The method also includes recycling the permeated steam to a vessel positioned upstream from the reactor.

In another aspect, a carbon to liquids system is provided. The system includes a source of syngas and a first reactor coupled in flow communication with the syngas source and configured to receive a flow of syngas therein. The first reactor includes a polymeric material and reacts the syngas and a catalyst in a Fischer-Tropsch reaction that produces a product including steam. The polymeric material is configured to permit the permeation of the steam therethrough. The system also includes a recycle path coupled in flow communication with the first reactor, wherein the recycle path is configured to channel the permeated steam to a vessel positioned upstream from the first reactor.

In yet another aspect, a carbon to liquids reactor is provided. The reactor includes at least one reactor tube including a polymeric material. The at least one reactor tube reacts syngas and a catalyst in a Fischer-Tropsch reaction that produces a product including steam. The polymeric material is configured to permit the permeation of the steam therethrough. The reactor also includes a passage that substantially circumscribes the at least one reactor tube, wherein the passage is configured to channel a flow of fluid therethrough that facilitates removing the permeated steam from the at least one reactor tube.

DETAILED DESCRIPTION OF THE INVENTION

Embodiments of the present disclosure relate to a method and systems for producing liquid hydrocarbon fuels from a Fischer-Tropsch (FT) synthesis reaction. More specifically, in the exemplary embodiments, the FT reactor is constructed at least partially from a permeable material, or membrane, that can selectively remove products generated during the FT reaction that may have a detrimental impact on conversion of the feed gas to viable liquid hydrocarbon fuels. For example, the FT reactor may be constructed from a material that has high water-to-hydrogen and high water-to-carbon monoxide selectivity. As such, the selective removal of water, in the form of steam, from the FT reactor facilitates increasing carbon monoxide conversion by up to about 20% by enabling the hydrogen retentate to remain in the FT reactor for further processing.

Moreover, because the FT synthesis reaction is an exothermic reaction, at least some known FT reactors use a flow of cooling water to facilitate reducing the temperature of the reactants within the reactor to optimum reaction levels. Generally, the cooling water is subsequently channeled away from the reactor and not used further. In the exemplary embodiments, the fluid used to cool the FT reactor at least partially includes natural gas. Accordingly, the heat transferred from the FT reactor to the cooling fluid results in a heated natural gas stream. The heated natural gas stream may be recycled upstream from the FT reactor, thereby facilitating reducing the amount of energy required to pre-heat natural gas and steam for use by a steam reformer or catalytic partial oxidation reactor. Furthermore, in the exemplary embodiment, the natural gas flow acts as a sweeping medium that facilitates removing the steam permeate from the FT reactor. As such, the permeated steam may also be used upstream from the FT reactor to facilitate increasing the efficiency of the carbon to liquids system.

Figure 1:
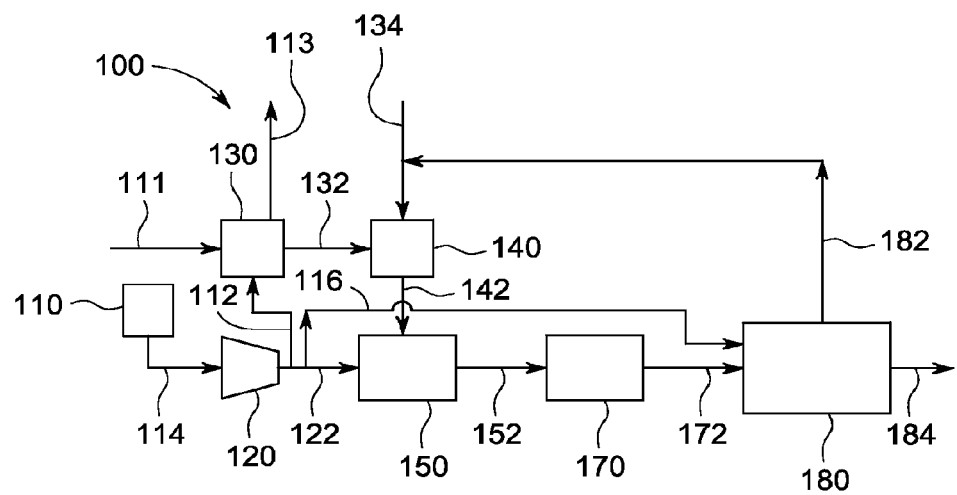
FIG. 1 is a schematic view of an exemplary carbon to liquids system.
Figure 2:
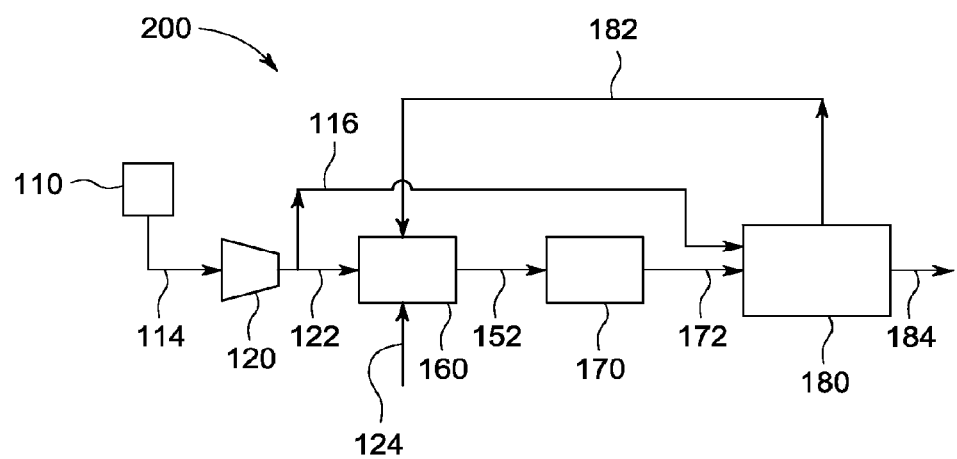
FIG. 2 is a schematic view of an alternative exemplary carbon to liquids system.

FIG. 1 is a schematic view of a carbon to liquids system 100, and FIG. 2 is a schematic view of an alternative carbon to liquids system 200. In the exemplary embodiment, system 100 includes a natural gas (NG) source 110, a boiler 130 coupled downstream from NG source 110, and a heat exchanger 140 coupled downstream from boiler 130. Moreover, system 100 includes a compressor 120 coupled downstream from NG source 110, and a steam reformer 150 coupled downstream from heat exchanger 140 and compressor 120. In the exemplary embodiment, steam reformer 150 is used to convert methane and water to carbon monoxide and hydrogen. Generally, steam reformer 150 operates at a temperature of about 800° C. As such, the steam reformer feeds must be pre-heated to a predetermined temperature before being channeled to steam reformer 150.

In the exemplary embodiment, natural gas 112 is channeled from NG source 110, via a flow of compressed natural gas 122, to boiler 130 where the natural gas is heated to a predetermined temperature with air 111. For example, natural gas is heated to a temperature of from about 400° C. to about 1000° C. Heated natural gas 132 is then channeled to heat exchanger 140 where it is combined with water 134 and a recycle stream 182, and a waste flue gas 113 that includes carbon dioxide and nitrogen is discharged from boiler 130. As will be explained in more detail below, recycle stream 182 includes a flow of heated natural gas and permeated steam. In the exemplary embodiment, boiler 130 pre-heats natural gas 112 to the predetermined temperature, and heat exchanger 140 is used to supplement heating a feed stream 142 to a temperature of about 800° C. for use by steam reformer 150. As such, by channeling recycle stream 182 to heat exchanger 140 for use in feed stream 142, the energy costs associated with pre-heating using only boiler 130 are facilitated to be reduced.

In the exemplary embodiment, NG source 110 channels a flow of natural gas 114 to compressor 120, and steam reformer 150 receives a flow of compressed natural gas 122 and feed stream 142 to produce a flow of synthesis gas (syngas) 152 in the following reaction:

$$CH_4 + H_2O \rightarrow 3H_2 + CO$$

Referring to FIG. 2, in an alternative exemplary embodiment, a methane catalytic partial oxidation (CPO) reactor 160 is used to convert methane and oxygen to carbon monoxide and hydrogen. Because catalytic partial oxidation is an exothermic reaction that operates at an inlet temperature of about 300° C., CPO reactor 160 may be used in place of boiler 130, heat exchanger 140, and steam reformer 150. In the exemplary embodiment, CPO reactor 160 is coupled downstream from NG source 110 and compressor 120. As such, CPO reactor 160 receives a flow of compressed natural gas 122, a flow of gas 124, and recycle stream 182 therein to produce a flow of syngas 152 in the following reaction:

$$CH_4 + \tfrac{1}{2}O_2 \rightarrow 2H_2 + CO$$

In some embodiments, gas flow 124 includes air, compressed air, oxygen, oxygen enriched air, and combinations thereof.

In the exemplary embodiment, a water-gas shift reactor 170 is coupled downstream from steam reformer 150 or CPO reactor 160, and is configured to receive syngas 152 therein. Shift reactor 170 is used to facilitate increasing a hydrogen to carbon monoxide ratio of syngas 152 by converting carbon monoxide and water to carbon dioxide and hydrogen. As such, shift reactor 170 increases the hydrogen to carbon monoxide ratio in shifted syngas 172 to facilitate optimizing the C5+ selectivity during a FT synthesis reaction. In alternative embodiments, the hydrogen to carbon monoxide ratio is controlled by controlling the steam/methane and/or oxygen/methane ratios.

Systems 100 and 200 also include a Fischer-Tropsch (FT) reactor 180 coupled downstream from shift reactor 170. FT reactor 180 is configured to convert hydrogen and carbon monoxide to steam and hydrocarbons. More specifically, the Fischer-Tropsch reaction for converting shifted syngas 172 is characterized by the two following general reactions, which produce paraffinic hydrocarbons (reaction 1) and olefinic hydrocarbons (reaction 2):

$$(2n+1)H_2 + nCO \rightarrow C_nH_{2n+2} + nH_2O \quad (1)$$

$$2nH_2 + nCO \rightarrow C_nH_{2n} + nH_2O \quad (2)$$

In the exemplary embodiment, FT reactor 180 uses any suitable catalyst that enables FT reactor 180 to function as described herein. For example, suitable catalysts include, but are not limited to an iron-based catalyst, a cobalt-based catalyst, a ruthenium-based catalyst, and combinations thereof. In some embodiments, the catalyst can be packed either inside or outside of FT reactor 180. FT reactor 180 receives shifted syngas 172 at a temperature of from about 150° C. to about 350° C., and at a pressure of from about 25 bar to about 35 bar.

Generally, the FT synthesis reaction is an exothermic reaction that operates at a temperature of from about 150° C. to about 350° C. While a higher temperature may result in an increased conversion rate of hydrogen and carbon monoxide to hydrocarbons, the higher temperatures may also favor C4− production. As such, a flow of cooling fluid is channeled past FT reactor 180 to facilitate maintaining an optimum temperature of the reactants within FT reactor 180. In the exemplary embodiment, the cooling fluid is natural gas 116 that is channeled from NG source 110 to facilitate cooling the reactants. In an alternative embodiment, cooling natural gas 116 may be combined with water or any other suitable cooling fluid that enables systems 100 and 200 to function as described herein. Cooling natural gas 116 absorbs the heat from the exothermic FT reaction and is discharged from FT reactor in the form of recycle stream 182. As described above, recycle stream 182 is used to facilitate decreasing the energy required to pre-heat natural gas 112 that is fed to steam reformer 150 and/or used in CPO reactor 160. In the exemplary embodiment, cooling natural gas 116 is channeled to FT reactor 180 at room temperature and a pressure of about 30 bar, and recycle stream 182 is discharged from FT reactor 180 at a temperature of from about 150° C. to about 350° C. and a pressure of about 30 bar. Furthermore, hydrocarbons 184 generated by FT synthesis are discharged from FT reactor 180.

Figure 3:
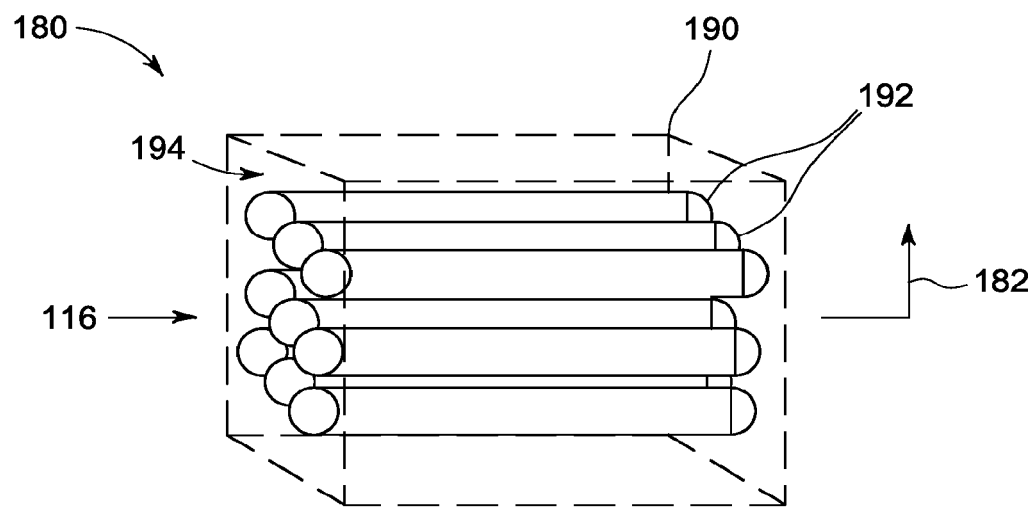
FIG. 3 is a perspective view of an exemplary Fischer-Tropsch reactor that may be used with the carbon to liquids systems shown in FIGS. 1 and 2.
Figure 4:
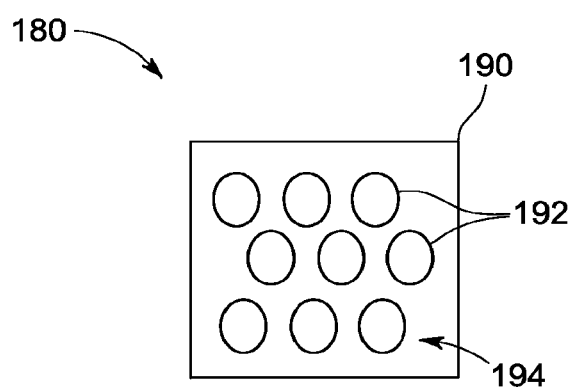
FIG. 4 is an axial view of the Fischer-Tropsch reactor shown in FIG. 3.

FIG. 3 is a perspective view of FT reactor 180, and FIG. 4 is an axial view of FT reactor 180. In the exemplary embodiment, FT reactor 180 includes a housing 190, a plurality of reactor tubes 192 positioned within housing 190, and a cooling passage 194 that substantially circumscribes reactor tubes 192, and is positioned between reactor tubes 192 and housing 190. Cooling passage 194 is configured to channel cooling natural gas 116 past reactor tubes 192. Furthermore, reactor tubes 192 are spaced from each other and from housing 190 such that cooling natural gas 116 may be channeled past the outer surface of each reactor tube 192 to facilitate cooling reactants contained therein. Reactor tubes 192 extend in an axial direction with respect to the flow of cooling natural gas 116 channeled through cooling passage 194 to facilitate increasing the residence time that cooling natural gas 116 contacts reactor tubes 192. Although shown as including nine reactor tubes 192, FT reactor 180 may include any suitable number of reactor tubes 192 that enables FT reactor 180 to function as described herein.

As described above, a byproduct of a FT synthesis reaction is water, in the form of steam, which may decrease the conversion of hydrogen and carbon monoxide to viable hydrocarbons. Accordingly, in the exemplary embodiment, reactor tubes 192 are constructed at least partially of a material that is configured to permit the permeation of the steam produced from the FT reaction therethrough. More specifically, reactor tubes 192 may be constructed at least partially of a polymeric material that can survive the harsh conditions of a FT synthesis reaction and temperatures of up to about 350° C.

For example, suitable polymeric materials include, but are not limited to, a polyimide material, a polysulfone material, polyamide, a polyaramide material, a polycarbonate material, aliphatic polyamides, polyesters, polycarbonates, copolycarbonate esters, polyethers, polyetherketones, polyetherimides, polyethersulfones, polyetheresters, polysulfones, polyvinylidene fluoride, polybenzimidazoles, polybenzoxazoles, polyaerylonitrile, polyazoaromatics, poly(2,6-dimethylphenylene oxide), polyphenylene oxides, polyureas, polyurethanes, polyhydrazides, polyazomethines, polyacetals, cellulosic derivatives, cellulose acetates, cellulose nitrate, ethyl cellulose, styrene-acrylonitrile copolymers, brominated poly(xylene oxide), sulfonated poly(xylylene oxide), polyquinoxaline, polyamideimides, polyamideesters, polysiloxanes, polyacetylenes, polyphosphazenes, polyolefines, polyethylene, polypropylene, polyphenylenes, poly(4-methylpentene), poly (trimethylsilylpropyne), polyesters, blends thereof, copolymers thereof, and substituted polymers thereof. In the exemplary embodiment, the polymeric material is VTEC PI® ("VTEC PI" is a registered trademark of Richard Blaine International, Inc. of Reading, Pa.).

In the exemplary embodiment, cooling natural gas 116 channeled through cooling passage 194 acts as a sweeper to remove the steam permeate from FT reactor 180. As such, recycle stream 182 includes a heated flow of natural gas and steam permeate for use upstream from FT reactor 180. More specifically, in the exemplary embodiment, recycle stream 182 is channeled directly to one of boiler 130, heat exchanger 140, or CPO reactor 160 (shown in FIGS. 1 and 2). By removing the permeated steam from FT reactor 180, carbon monoxide conversion may be increased by up to about 20% such that the overall conversation is at least 45%.

In the exemplary embodiment, the polymeric material used to form reactor tubes 192 is configured to have high water-to-hydrogen and high water-to-carbon monoxide selectivity. For example, the polymeric material is configured to permit the passage of water therethrough, and configured to substantially resist the permeation of hydrogen and carbon monoxide therethrough. In one embodiment, the polymeric material has a water-to-hydrogen separation factor (SF) of up to about 15 and a water-to-carbon monoxide SF of up to about 500 at 200° C. In an alternative embodiment, the polymeric material may be configured to permit the passage of hydrocarbons therethrough, and configured to substantially resist the permeation of carbon monoxide, hydrogen, and water therethrough.

In some embodiments, reactor tubes 192 are constructed in either a hollow fiber membrane configuration or a coated tube configuration. In the hollow fiber membrane configuration, reactor tubes 192 are constructed substantially exclusively from a polymeric material. In one embodiment, the hollow fibers can have a diameter of from about 20 μm to about 2000 μm, and any suitable length that enables reactor tubes 192 to function as described herein. For example, the hollow fibers can have a length of from about 10 cm to about 1.2 m. In the coated tube configuration, reactor tubes 192 are constructed from a steel material with a polymer coating applied thereon. For example, in one embodiment, the steel tube has a length of about 20 cm, a diameter of about 1.27 cm (0.5 in), and a pore size of about 2 microns. The polymer coating is applied on the inside of the steel tube at a thickness of from about 1 micron to about 5 microns thereby reducing the pore size of reactor tubes 192 to less than about 1.5 microns.

The carbon to liquids system described herein uses a Fischer-Tropsch reactor constructed at least partially from a polymeric membrane material that enables the permeation of steam therethrough. Generally, Fischer-Tropsch reactors constructed of steel or other known materials facilitate minimizing catalyst deactivation by controlling the partial pressure of water produced during Fischer-Tropsch synthesis and/or by adding a certain quantity of titanium therein. By constructing the Fischer-Tropsch reactor of a polymeric membrane material that has high water-to-hydrogen and high water-to-carbon monoxide selectivity, the water produced by the Fischer-Tropsch reaction is removed before it can deactivate the reaction catalyst. Moreover, the system described herein recycles the permeated steam in a flow of cooling natural gas to a vessel positioned upstream from the Fischer-Tropsch reactor. As such, the permeated steam may be used as a reactant in the vessel and/or the heated recycle stream may facilitate reducing the capital expenditures associated with steam methane reforming and catalytic partial oxidation by at least 10%.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A carbon to liquids reactor comprising:
 a reactor configured to receive a flow of cooling fluid therein,
 the reactor having a passage that circumscribes at least one reactor tube present in the reactor in which syngas can be reacted in the presence of a catalyst in a Fischer-Tropsch reaction that produces a product comprising hydrocarbons and steam, wherein the reactor tube comprises a polymeric material permeable to steam thereby enabling steam to permeate through the polymeric material into the passage, and wherein the passage is configured to enable flow of the cooling fluid therethrough to enable contact of the cooling fluid with the permeated steam in the passage.

2. The carbon to liquids reactor of claim 1, wherein the cooling fluid comprises natural gas.

3. The carbon to liquids reactor of claim 1, wherein the passage is configured to channel a flow of cooling fluid therethrough to reduce the temperature of reactants in said at least one reactor tube.

4. The carbon to liquids reactor of claim 1 wherein the polymeric material is any one or more of polyamide, polyaramide, polycarbonate, aliphatic polyamides, polyesters, polycarbonates, copolycarbonate esters, polyethers, polyetherketones, polyetherimides, polyethersulfones, polyetheresters, polysulfones, polyvinylidene fluoride, polybenzimidazoles, polybenzoxazoles, polyaerylonitrile, polyazoaromatics, poly(2,6-dimethylphenylene oxide), polyphenylene oxides, polyureas, polyurethanes, polyhydrazides, polyazomethines, polyacetals, cellulosic derivatives, cellulose acetates, cellulose nitrate, ethyl cellulose, styrene-acrylonitrile copolymers, brominated poly(xylene oxide), sulfonated poly(xylylene oxide), polyquinoxaline, polyamideimides, polyamideesters, polysiloxanes, polyacetylenes, polyphosphazenes, polyolefines, polyethylene, polypropylene, polyphenylenes, poly(4-methylpentene), poly(trimethylsilylpropyne), polyesters, blends thereof, copolymers thereof, and substituted polymers thereof.

5. The carbon to liquids reactor of claim 1, wherein the polymeric material can withstand temperatures of up to about 350° C.

6. The carbon to liquids reactor of claim 1, wherein the polymeric material resists permeation of hydrogen and carbon monoxide therethrough.

7. The carbon to liquids reactor of claim 6, wherein the polymeric material comprises a water-to-hydrogen separation factor of up to about 15 and a water-to-carbon monoxide separation factor of up to about 500.

8. The carbon to liquids reactor of claim 1, wherein said at least one reactor tube is constructed at least partially of metal having the polymeric material thereon.

9. A carbon to liquids system comprising,
a source of syngas;
a cooling fluid source,
a reactor in flow communication with the syngas source and with the cooling fluid source and configured to receive a flow of syngas and a flow of cooling fluid therein, the reactor comprising at least one reactor tube in which the syngas can be reacted in the presence of a catalyst in a Fischer-Tropsch reaction that produces a product comprising hydrocarbons and steam wherein the reactor tube comprises a polymeric material permeable to steam, the reactor having a passage that circumscribes the at least one reactor tube comprising a polymeric material permeable to steam thereby enabling steam to flow into the passage, wherein the passage is configured to enable flow of the cooling fluid therethrough, and wherein passage is in flow communication with syngas source to enable recycle of a mixture of steam and the cooling fluid to the syngas source.

10. The carbon to liquids system of claim 9 wherein the cooling fluid comprises natural gas.

11. The carbon to liquids system of claim 9 wherein the syngas source comprises a catalytic partial oxidation reactor.

12. The carbon to liquids system of claim 9 wherein the syngas source comprises a steam reformer.

13. The carbon to liquids system in accordance with claim 9 wherein the polymeric material is any one or more of polyimide, polysulfone, polyamide, polyaramide, polycarbonate, aliphatic polyamides, polyesters, polycarbonates, copolycarbonate esters, polyethers, polyetherketones, polyetherimides, polyethersulfones, polyetheresters, polysulfones, polyvinylidene fluoride, polybenzimidazoles, polybenzoxazoles, polyaerylonitrile, polyazoaromatics, poly(2,6-dimethylphenylene oxide), polyphenylene oxides, polyureas, polyurethanes, polyhydrazides, polyazomethines, polyacetals, cellulosic derivatives, cellulose acetates, cellulose nitrate, ethyl cellulose, styrene-acrylonitrile copolymers, brominated poly(xylene oxide), sulfonated poly(xylylene oxide), polyquinoxaline, polyamideimides, polyamideesters, polysiloxanes, polyacetylenes, polyphosphazenes, polyolefines, polyethylene, polypropylene, polyphenylenes, poly(4-methylpentene), poly(trimethylsilylpropyne), polyesters, blends thereof, copolymers thereof, and substituted polymers thereof.

14. The carbon to liquids system in accordance with claim 9 wherein the polymeric material comprises a water-to-hydrogen separation factor of up to about 15 and a water-to-carbon monoxide separation factor of up to about 500.

* * * * *